United States Patent [19]

Lala

[11] 4,048,408
[45] Sept. 13, 1977

[54] ZINC ELECTRODE FOR ALKALINE RESERVE BATTERIES

[75] Inventor: Arun Lala, Duisburg, Germany

[73] Assignee: Electrochem, Inc., New York, N.Y.

[21] Appl. No.: 705,750

[22] Filed: July 26, 1976

[30] Foreign Application Priority Data

July 16, 1975 Germany .............................. 2531751

[51] Int. Cl.$^2$ ............................................. H01M 4/24
[52] U.S. Cl. ..................................... 429/229; 429/245
[58] Field of Search ............... 429/229, 230, 231, 218, 429/219, 233, 245

[56] References Cited

U.S. PATENT DOCUMENTS

| | | | |
|---|---|---|---|
| 1,366,490 | 1/1921 | Pouchain | 429/229 |
| 1,508,613 | 9/1924 | Pouchain | 429/229 |
| 3,069,486 | 12/1962 | Solomon et al. | 429/229 |
| 3,317,350 | 5/1967 | Murphy | 429/229 X |

*Primary Examiner*—Anthony Skapars

*Attorney, Agent, or Firm*—Donald E. Nist

[57] ABSTRACT

The present invention is directed to a zinc electrode of improved type for alkaline batteries of the deferred action or reserve type, which batteries include a silver oxide electrode and a separator. The zinc electrode is provided with a current collector having a foil or grid of aluminum or aluminum alloy therearound adjacent the surface of that electrode. The foil or grid may have an increased surface area provided by a profile which has been etched or otherwise disposed therein. The current collector can include a copper core. The foil or grid can be applied to both sides of the core and a sheet of zinc can be applied to each sheet of the foil or grid. The resulting zinc electrode has increased resistance to passivation which normally occurs at low temperatures and when zinc electrodes are discharged at high current densities. An improvement in the efficiency of the zinc electrode at high current density as well as low temperatures is provided in accordance with the present invention.

12 Claims, 3 Drawing Figures

ZINC ELECTRODE FOR ALKALINE RESERVE BATTERIES

BACKGROUND OF THE INVENTION

1. Field of the Invention

The present invention generally relates to electrochemical cells and batteries and more particularly relates to electrochemical cells and batteries employing zinc electrodes, as well as silver oxide electrodes and separators.

2. Prior Art

As is well known, in zinc-silver oxide batteries the zinc electrodes tend to become passivated at low temperatures and when discharged at high current density. Zinc which is dissolved during the current discharge changes into zincate, which is in chemical equilibrium with zinc hydroxide. The latter is, in turn, in equilibrium with zinc oxide. However, at low temperatures the diffusion of the zincate is obstructed, and at high current densities more zincate is produced. Both causes, alone or together, have the effect of increasing the concentration of zincate in the area of the zinc surface of the electrode. At higher concentrations of the zincate the point of equilibrium is shifted towards zinc hydroxide and further towards zinc oxide, which then accumulates as a top layer at the surface of the electrode, and prevents further dissolution of the zinc. This behaviour is called passivation. It is highly desirable to be able to prevent or impede passivation in such cells in order to improve cell efficiency.

SUMMARY OF THE INVENTION

The present invention satisfies the foregoing need. Thus, a zinc electrode is provided which resists the formation of a passivation layer in a zinc-silver oxide battery at lower temperatures and/or high discharge densities. This effect is accomplished by providing the zinc electrode with a covering of foil or a grid of aluminum or aluminum alloy adjacent the surface of the zinc electrode. The foil or grid of aluminum or aluminum alloy when attached to the surfaces of the zinc electrode has an unexpected advantage in that, in a surprising manner, there are obtained from the electrode considerably higher current densities and a higher exploitation of current. In addition, the energy content (watts per kg) as well as the energy density (watts per $dm^3$) are higher. Moreover, gas evolution from the aluminum is reduced because zinc is present. Tests have shown that the best temperature range is 0° C and higher. The actual optimum temperature depends on the particular composition and the surface structure of the aluminum. Further features are set forth in the following detailed description and accompanying drawings.

DRAWINGS

DETAILED DESCRIPTION

The foil or the grid of aluminum or aluminum alloy can be attached to the zinc electrode in any number of ways. Thus, for example, it is possible to form a zinc electrode of the present invention by applying to both sides of a current collector of copper a sheet in the form of a foil or a grid of aluminum or aluminum alloy and to apply in turn to each of these sheets a sheet of zinc. The zinc sheet may consist of a perforated sheet of zinc. But it is possible to also use grids or foils of zinc or foils or sheets of pressed zinc powder. It is also possible to attach the sheet of foil or the grid of aluminum to the outer surfaces of the zinc electrode (sheets or strips or the like), which may be provided on the inside thereof with the current collector. It is further possible to use foils or grids of aluminum in bipolar electrodes.

The foil or the grid used in the zinc electrode may consist of pure aluminum or of aluminum alloys. Furthermore, it is possible to enlarge its surfaces by providing irregular raised or grooved areas, corrugations, perforations or the like, as by etching, controlled corrosion, etc.

Figure 1:
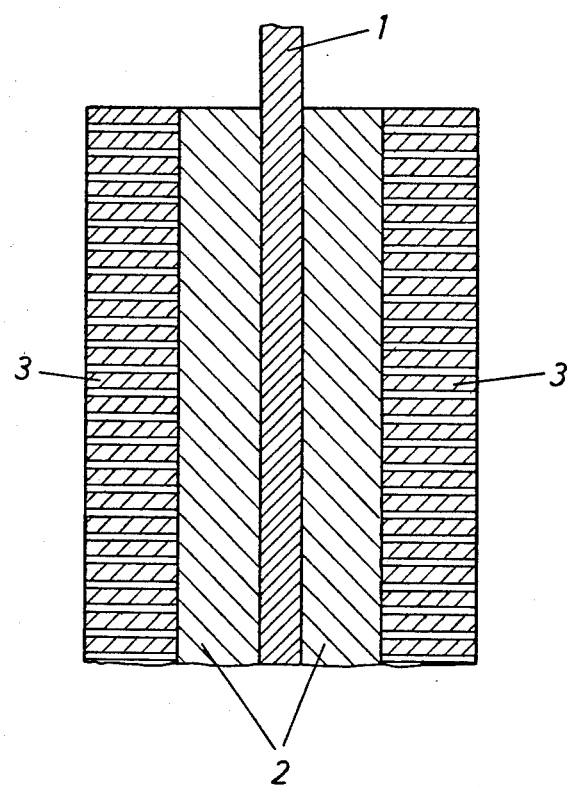
FIG. 1 is a schematic cross section of a preferred embodiment of the zinc electrode of the invention.

Now referring more particularly to FIG. 1 of the drawings, a preferred embodiment of the zinc electrode of the present invention is schematically depicted in cross section. Thus, the electrode may consist of a copper current collector 1, on both sides of which are disposed single sheets 2 of aluminum foil. Sheets 2 may be, for example, pure aluminum or aluminum alloyed with magnesium, tin, beryllium, silicon or the like. Preferably, sheets 2 have increased surface area, due to corrugations, grooves, etc. Against both sheets 2 are attached sheets 3 of zinc in foil or grid form or in the form of pressed powder strips or the like. When inserted into a cell alongside a silver oxide electrode the zinc electrode preferably is constructed in the form of a flattened spiral, with the edges folded against each other.

Figure 2:
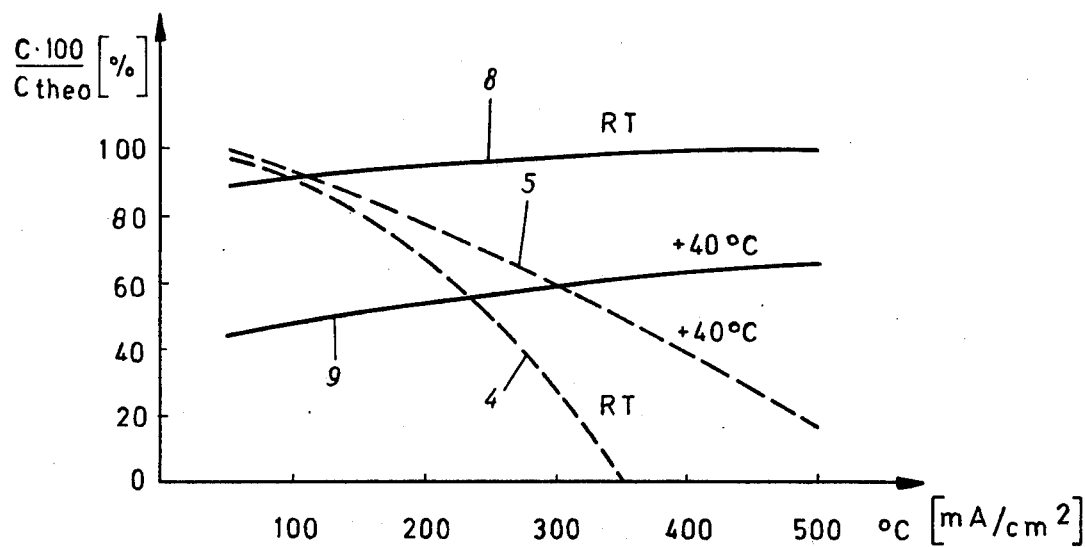
FIG. 2 is a graph depicting efficiency curves for a zinc electrode of the prior art against a silver oxide reference electrode; and, FIG. 3 is a graph depicting efficiency curves for a zinc electrode of the present invention measured against a silver oxide reference electrode.
Figure 3:
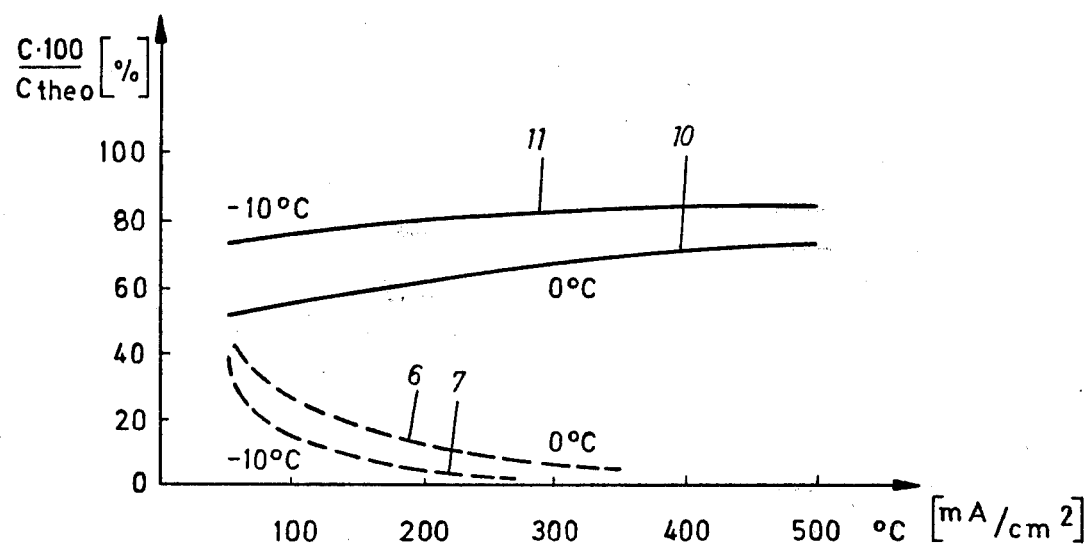

In the diagrams of FIGS. 2 and 3 are shown the efficiency curves during electrical discharge of zinc electrodes against a silver oxide reference electrode. Capacity versus current density is depicted. Curves 4 to 9 show the behaviour of a common zinc electrode at various temperatures. In contrast, curves 6 to 11 show corresponding behavior with zinc electrodes which, in accordance with the present invention, are provided with the addition of aluminum foils. It is clear that essentially higher efficiencies are attained at increased current densities and at lower temperatures for the zinc electrodes of the present invention (diagram 3), in contrast to those of diagram 2. The new zinc electrodes of the invention with the added sheets of aluminum are particularly suitable whenever higher current densities and/or lower temperatures of operation are present.

Various modifications, changes, alterations and additions can be made in the zinc electrode of the invention and in its components and parameters. All such modifications, changes, alterations and additions as are within the scope of the appended claims form part of the present invention.

What is claimed is:

1. An improved zinc electrode for alkaline batteries of the deferred action or reserve type which include a silver oxide electrode and a separator, said zinc electrode including a current collector and a thin sheet of extended surface area, comprising aluminum adjacent to the surface to the said electrode.

2. The improved zinc electrode of claim 1, wherein said current collector comprises copper with said aluminum sheet disposed on both sides thereof and with a sheet of zinc overlying said aluminum sheet.

3. The improved zinc electrode of claim 1 wherein said aluminum sheet consists essentially of aluminum.

4. The improved zinc electrode of claim 1 wherein said aluminum sheet consists essentially of aluminum alloy.

5. The improved zinc electrode of claim 2 wherein said aluminum sheet consists essentially of aluminum.

6. The improved zinc electrode of claim 2 wherein said aluminum sheet consists essentially of aluminum alloy.

7. The improved zinc electrode of claim 1 wherein said aluminum sheet has an enlarged surface area.

8. The improved zinc electrode of claim 2 wherein said aluminum sheet has an enlarged surface area.

9. The improved zinc electrode of claim 3 wherein said aluminum sheet has an enlarged surface area.

10. The improved zinc electrode of claim 4 wherein said aluminum sheet has an enlarged surface area.

11. The improved zinc electrode of claim 5 wherein said aluminum sheet has an enlarged surface area.

12. The improved zinc electrode of claim 6 wherein said aluminum sheet has an enlarged surface area.

* * * * *